UNITED STATES PATENT OFFICE.

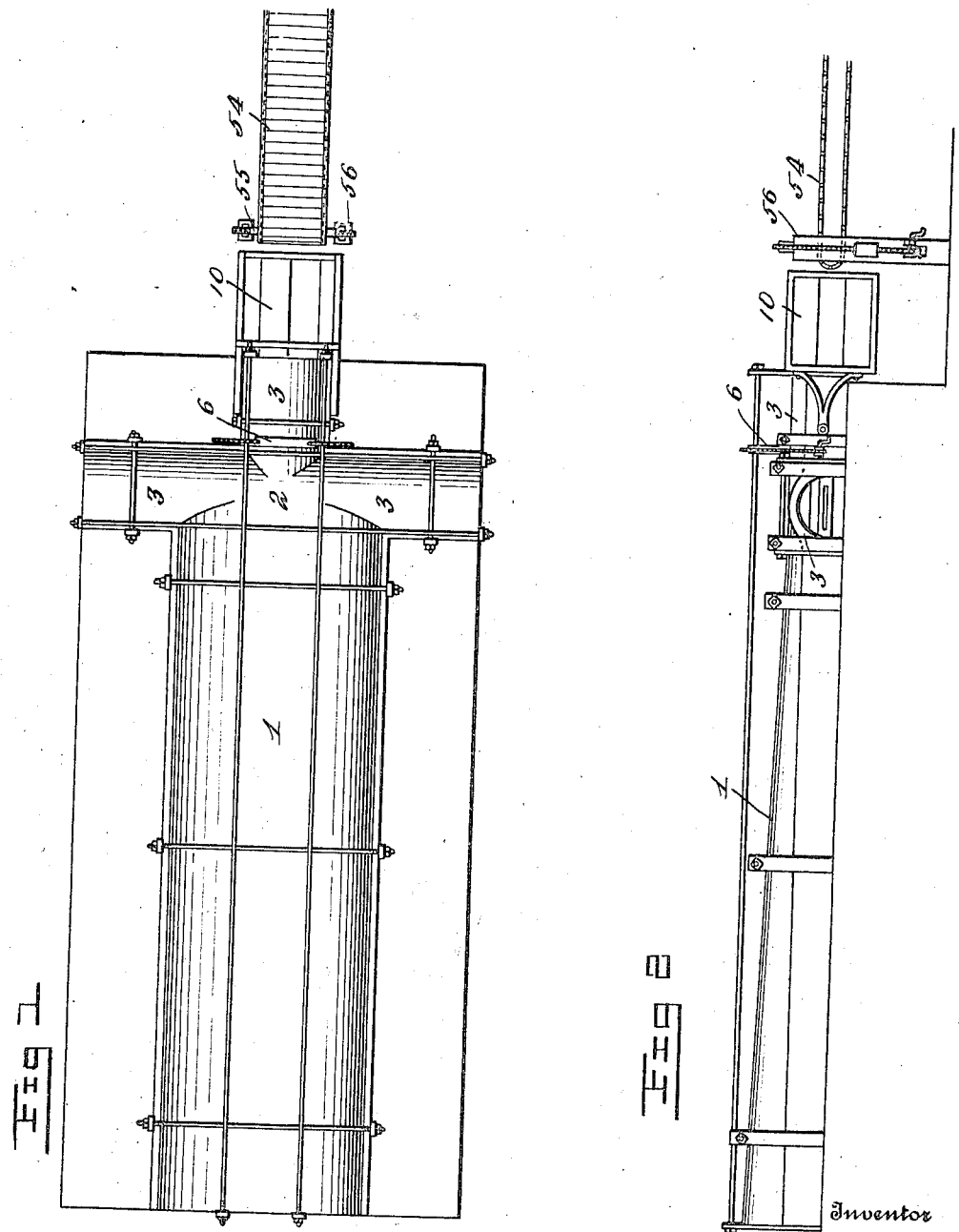

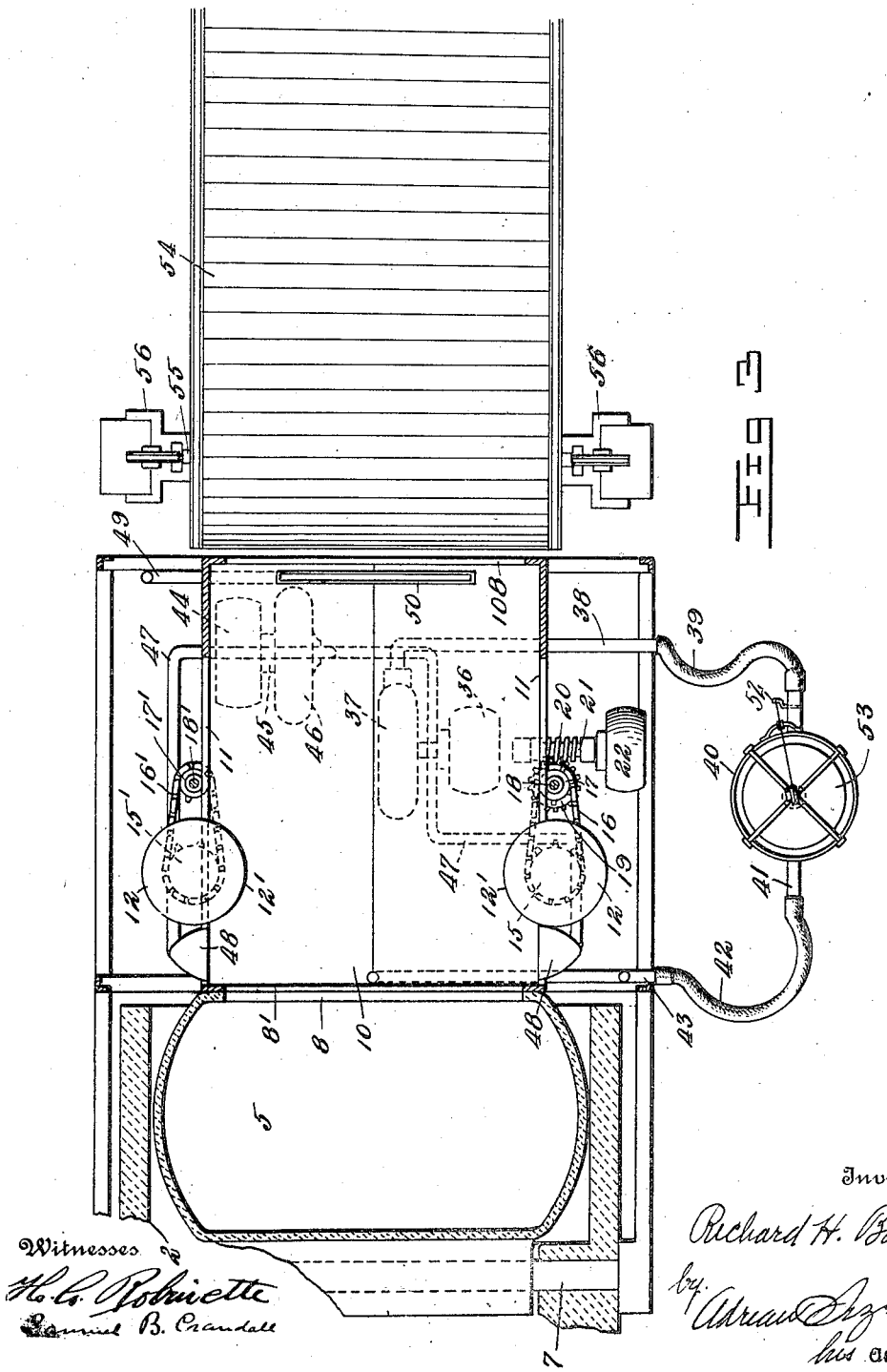

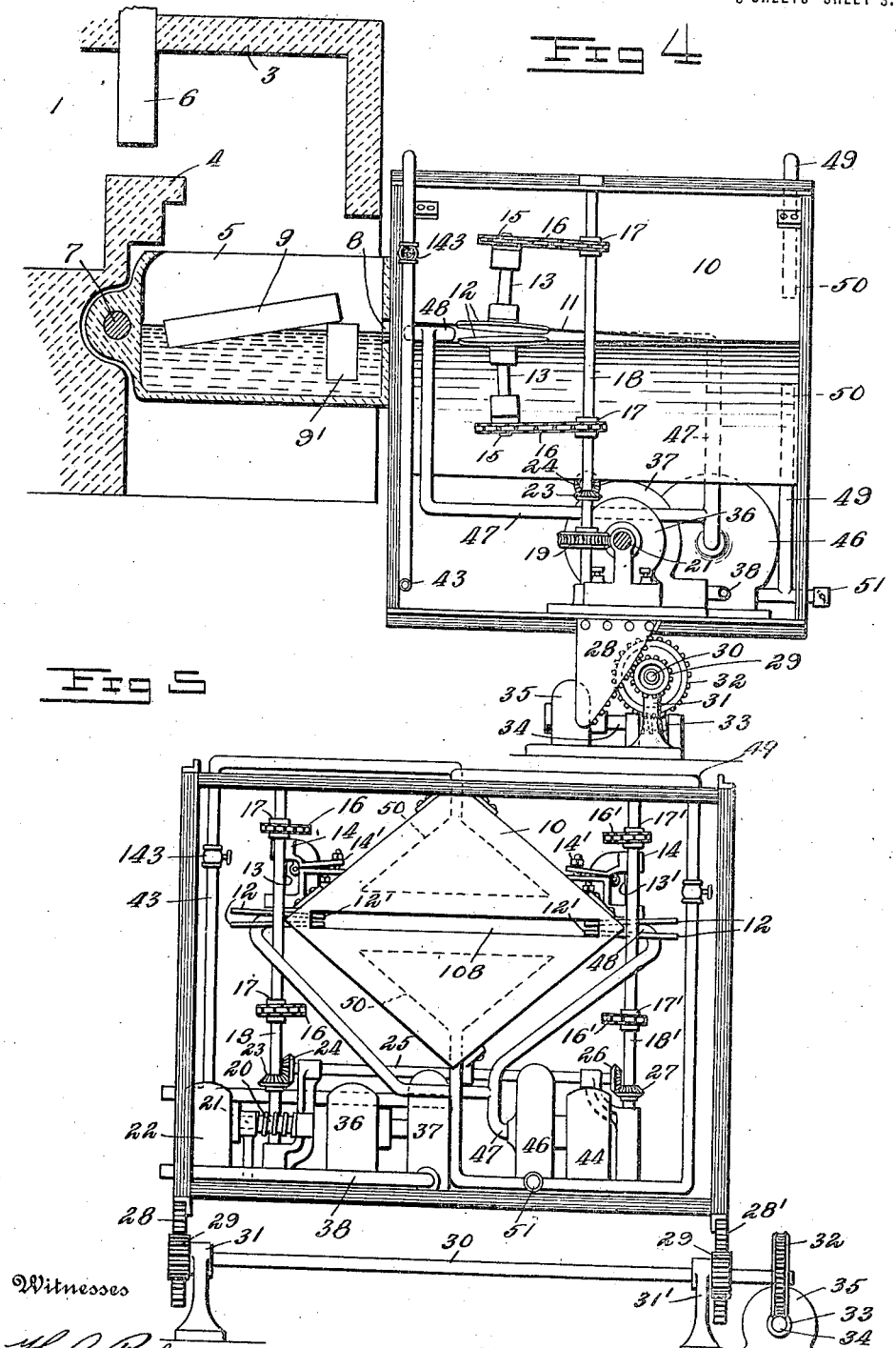

RICHARD H. BOLIN, OF ROCHESTER, NEW YORK.

GLASS MANUFACTURE.

1,280,139.

Specification of Letters Patent.

Patented Oct. 1, 1918.

Application filed February 17, 1915. Serial No. 8,749.

*To all whom it may concern:*

Be it known that RICHARD H. BOLIN, a citizen of the United States, residing at Rochester, in the county of Monroe and State of New York, has invented certain new and useful Improvements in Glass Manufacture, of which the following is a specification.

This invention relates to the art of making glass, and more particularly to the art of making sheet glass directly from a mass of molten or plastic glass without undergoing the various stages of blowing in cylinder formation, annealing, flattening and other steps in reducing the glass to a commercial state.

The primary object of this invention is to provide an apparatus which shall be capable of producing glass in sheet formation ready for commercial use by transferring the glass from a tank of molten metal directly into the finished sheet formation without first having to undergo the usual subsequent flattening, polishing, etc.

Many efforts have heretofore been made to continuously draw a sheet of glass from a molten mass, but without practical commercial success. This is largely due to impractical means employed in keeping the sheet of glass from narrowing as the drawing process continues. These means have usually consisted of gripping devices, or revolving bodies placed in contact with the glass, intending to exert a lateral strain thereon. It is well known in the art, that no medium having an unyielding surface can be placed in contact with semi-plastic glass without an abrasion of the surface thereof to a detrimental effect.

By my improved apparatus I overcome the many difficulties experienced in the effort to draw sheet glass from a mass of molten glass, principally among which is the difficulty of maintaining the sheet being drawn at a uniform width. This difficulty has been experienced due to the inability to maintain the glass in sheet formation as it emerges from the molten mass, as the natural tendency of any material of plastic formation is to narrow itself through any process of drawing until its width becomes substantially uniform with its thickness.

With this object in view the invention consists in drawing from a suitable receptacle containing a mass of molten glass, a flat sheet of glass, which simultaneously with the operation of drawing the same from the molten mass, has applied thereto a combination of forces adapted to impart lateral tension to the surface portion of the sheet, away from the medial line of the sheet, and in a direction toward its edges. By the application of such lateral tension, the natural tendency of the sheet to narrow during the drawing operation is compensated for, and a sheet of uniform width with a degree of smoothness heretofore unaccomplished is produced.

In the common form of apparatus employed in the production of sheet glass, it has been customary to produce it in cylinder formation, and wherein the walls of the cylinder are kept in proper and relative position by an expanding force of air introduced into the cylinder. The successful production of glass by these means, may be attributed largely to the means of applying and maintaining a force against the inner walls of the cylinder which force, while exerting the proper expanding influence, is free from the detrimental effect of causing abrasion to the glass surface, so common where hard surface mediums are employed in supporting, expanding and imparting movement, to the sheet of glass by contact therewith, while in a semiplastic condition.

By the present invention it is for the first time rendered commercially practicable, to apply the same means for the same purposes to the drawing of a sheet of glass, as that applied in maintaining the expansion of a glass cylinder, and to the accomplishment thereof, I employ a moving volume of air as a medium upon which the sheet of glass is supported during the sheet drawing movement, as well as employing the same medium for maintaining the sheet in extended formation. This volume of air is introduced by novel means into a flume or passage way, through which the glass passes as it emerges from the drawing receptacle.

This invention therefore has as one of its objects, the control of the supply of air to the flume or passage way, as well as the exhausting of air from designated portions of the flume, in such manner as to maintain the sheet passing through the flume in plane formation from the point of its discharge from the drawing receptacle, to its exit from the air chamber or while undergoing the congealing state, and to this end, comprehends novel means for thus supplying and exhausting such air.

In the course of my experiments I have found that there is much uncertainty as to the required pressure necessary to maintain the sheet of glass supported as herein shown, and I am led to believe that it is more the question of volume of air under such conditions of pressure on the one surface, or absence of pressure or partial vacuum on the other surface, as it is necessary to maintain the sheet in plane formation during its congealing period.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportion, size and minor details of construction may be made without departing from the spirit or sacrificing any of the advantages of the invention. In the accompanying drawings:

Figure 1 is a plan view of the glass tank with the sheet glass forming apparatus attached thereto.

Fig. 2, is a side elevation of the same apparatus.

Fig. 3, is a view in plan, partly in section, of the air chamber and conveyer.

Fig. 4, is a view in vertical elevation and partly in section of the air chamber, and drawing receptacle, showing its relative position to the fragmentary parts of the glass tank.

Fig. 5, is a view in section through the inner end of the air chamber.

Referring now to the accompanying drawings, 1 represents a glass tank for containing molten glass. This tank may be of the usual construction, and my improved apparatus may be adapted to any of the glass tanks now in common use, that produce molten glass in the usual way.

Excepting as to that portion of the tank where the drawing takes place, it may be of any desired construction, but as to the part from which the glass is drawn, it is of novel construction, especially adapted to the carrying out of my improved process.

In carrying out this part of the invention, I provide the tank in the case shown with a plurality of extensions 2, built out from the main tank, over which are constructed dome like curved tops 3 extending over the space adapted to house the glass drawing receptacle 5. At the outer end of the tank extensions 2, is a breastwall 4, which forms the outer wall of the glass containing tank. Located under the dome covering 3, is a glass containing receptacle 5, adapted to receive glass as it overflows the breastwall 4. Located above the breastwall 4, and adapted to shut off the flow of glass is a gate 6, suitably suspended for vertical movement. I may provide for the vertical movement of the gate 6, in any of the several ways well known in the art.

The glass receptacle 5, is pivotally connected to the frame work on the main tank 1, by an extended knuckle through which the shaft 7 passes which provides for applying oscillating movement to the receptacle 5, hinged thereon. At the outer end of the receptacle 5 is an aperture 8, through which the glass is taken in the drawing operation. Located within the recepacle 5, are floaters 9—9', adapted to receive the flow of glass thereon as it falls from the breastwall 4, and to distribute the flow toward the sides of the receptacle.

Attached to the outer end of the glass receptacle 5, is a suitable frame work constructed of angle irons, within which is supported a diamond shaped air casing 10. This casing is placed in close contact with the outer end of the receptacle 5, and has a slot 8', which registers with the opening 8 in the drawing receptacle 5. The horizontal chine of the diamond shaped casing 10, have open seams 11, gradually increasing as they extend toward the end attached to the receptacle 5. Located near the same end and on each side of the casing 10, are a pair of revolving disks 12, the periphery 12' of which extend through the open seam 11, the purposes of which form an important feature of this invention. The disks 12 are four in number located in pairs on each side of the casing 10, one above the other and are adapted for rotative movement, and are so mounted that as they revolve, their periphery 12' is adapted to engage the outer edges of the sheet of glass as it passes through the air chamber 10. The shafts 13, upon which the disks 12 are mounted, are adapted to be more or less inclined from the vertical line, causing the disks to revolve in planes slightly deflected from the horizontal in such position that at such point where the peripheries 12' of the disks most nearly meet, the movement of the periphery as it engages the sheet is deflected away from the draft or medial line of the sheet, and in a direction toward its edges.

I provide adjustment of the rotative planes of the peripheries of the disks, by varying the angularity of the shafts 13, through the movement of the journal 14 by the adjusting screws 14'.

I provide rotative movement to the disks 12, by mounting on their shafts 13—13' sprocket wheels 15—15' over which pass sprocket chains 16—16' which in turn pass over sprocket wheels 17—17'. The sprocket wheels 17—17' are mounted on shafts 18—18', which are suitably journaled at their upper and lower terminals.

Located on the shaft 18 is a worm gear wheel 19, which meshes with the worm 20, attached to the armature shaft 21, of the electric motor 22 which receives its current from any source of electric supply. Located on the shaft 18, above the worm gear 19 is a miter gear 23 which meshes with miter gear 24, attached to the shaft 25. On the opposite end of the shaft 25, is a miter gear 26, which meshes with a miter gear 27 attached to the vertical shaft 18', providing the same rotative movement to the shafts 18—18'. By this arrangement the four disks 12 revolve in synchronizing movement, and at such degree of speed as may be desired. Located on the lower side of the frame supporting the air casing are quadrants 28—28', provided with gear teeth on their outer edges which engage the pinion gear 29 mounted on the shaft 30, which is suitably supported in the journals 31—31'. Located on the outer end of the shaft 30, is a worm gear wheel 32, which meshes with the worm 33, mounted on the armature shaft 34, of the electric motor 35, and is adapted to provide oscillating movement to the receptacle 5, and the attached frame work holding the air casing 10, as well as the disk operating mechanism connected therewith. To provide for movement in either direction a reversing pole switch (not shown) is placed in the circuit connecting the motor 35, with any source of electrical supply.

Located on a suitable support below the air casing 10, is an electric motor 36, the armature shaft of which is directly connected to a fan blower 37. The fan blower 37 discharges air through the conduit 38 which is attached by flexible connections 39, to an airometer 40. The purposes of the airometer will hereinafter be more fully explained. Connected to the airometer 40, is discharge conduit 41, which communicates through a flexible coupling 42, with a conduit 43, which leads to a manifold and discharges air through the upper and lower chines of the air casing 10, at a point near the end of the casing where the glass is introduced, from the receptacle 5. Located in the conduit 43 are suitable throttle valves 143 for controlling the supply of air passing through conduit 43. The purposes of the introduction of the air into the air chamber at this point forms an important step in the production of the glass by my improved apparatus.

Located on a suitable support, is an electric motor 44 whose armature shaft 45 is directly connected to a suction fan 46. Located on each side of the suction intake of the suction fan 46 are air conduits 47, leading to, and having their suction intake ducts 48, placed in the open seam 11, of the air chamber 10. In this manner I provide for obtaining the air supply of the suction fan 46, by drawing it from the air within the casing 10, thereby partially exhausting the air from the air casing at that point, and causing a strong movement of air to flow from the central portion of the casing, toward the suction ducts 48, and the open seams 11, formed in the horizontal chine of the casing.

The suction fan 46 is of much greater capacity than the fan blower 37, and is able to take care of all of the air introduced into the casing, with the additional assistance of the escapement of air through the open seams 11.

The openings 11 are progressively increased as they approach the suction ducts 48. This novel arrangement provides the strongest flow of air across the sheet of glass at its point of greatest plasticity and a progressive reduction of flow at points of lesser plasticity.

The discharge conduit 49 of the suction fan 46, is led to the discharge end of the air casing 10 where it is introduced into the casing through the discharge nozzle 50, located in close proximity to the slot 108 through which the sheet of glass emerges.

To provide for regulating the supply of air going through the discharge nozzle 50, I locate within the discharge conduit 47, of the suction fan, an adjustable vent 51, adapted to provide for discharging a part of the air from the conduit 49 into the atmosphere.

The airometer 40 may be of any of the forms now in common use, and has for its purposes the regulation of pressure of air passing through the outlet duct 41 by the movement of the valve or damper 52, which is actuated by the movement of the vertically disposed telescoping member 53 of the ariometer. As the pressure of air from the conduit 38 increases, it forces the telescopic member 53 to rise upward and the upward movement of the member 53, causes the gradual closing of the valve member 52, thereby reducing the amount of air passing through the conduit 38, into the airometer 40.

In the novel arrangement of supplying and exhausting air, from the air casing 10, while a sheet of glass is passing therethrough, I am able to apply a supporting medium to the under side of the sheet by which the sheet is maintained in plane formation during a period of partial congealment of the sheet, to such an extent that its surface can thereafter be placed in contact with a solid supporting means without an abrasion of the surface.

I also provide through a medium of moving air for applying a force laterally to the plastic sheet, to maintain the edges thereof in extended formation of the approximate width at which it emerges from the aperture 8 in the drawing receptacle 5, during the period of partial congealment, or while the sheet would otherwise be subject to narrowing tendencies through an application of draft thereto.

To provide for taking care of the sheet as it emerges from the air chamber 10, I provide an endless conveyer belt 54. The conveyer belt is adapted to travel at its one extremity over a pair of guide wheels suitably mounted on a shaft 55 which is journaled in the uprights 56 and adapted for vertical movement therein.

At the other extremity the conveyer belt may pass over a similar pair of guide wheels (not shown) to which is suitably connected any source of motive power. The conveyer 54 may be of any desired length necessary to apply a sufficient bearing surface to the glass conveyed thereon to exert the proper draft or pull to the glass passing through the air chamber.

I do not claim as part of my invention any specific form of conveyer so that further description of the details thereof are not necessary. As the sheet of glass leaves the conveyer it may be severed into sections by any means well known in the art.

The operation of drawing a sheet of glass with my improved apparatus is as follows: The drawing receptacle 5, having been filled with molten glass from the main tank 1, by the elevation of the gate 6, a suitable glass drawing bait (not shown) having relative dimensions to the slot 8, formed in the receptacle 5, and of such other form as is well known in the art, is then inserted through the air chamber 10, and into the slot 8, in the receptacle 5, and the glass drawing bait in this position practically fills the aperture 8, in the glass drawing receptacle 5. The receptacle actuating means are then applied, and the forward end of the receptacle 5, is depressed downwardly until the glass line therein has risen above the slot 8, into which the drawing bait has been introduced, causing the molten glass to surround the bait which is kept in contact with the molten glass until it has reached the stage of temperature whereby the molten glass adheres thereto. Suitable means are attached to the bait by which it is drawn outwardly with a sheet of glass adhering thereto, until the edges of the sheet have passed between the two pair of disks 12 when the mechanism for placing the disks 12, in rotation is set in motion. The blower motors 36 actuating the fan 37 and the motor 44 actuating the suction fan 46, are set in motion, and the bait is drawn outwardly until the sheet of glass attached thereto, has emerged from the air chamber through the slot 108 and has been deposited upon the endless carrier 54.

When the bait has drawn a sufficient length of glass and deposited it upon the movable conveyer to cause a sufficient draft to be applied to the sheet by its contact with the conveyer to continue to draw the sheet, the bait is detached from the sheet, and need not again be used until it is desired to start another drawing operation. The glass drawing bait is only used in the initial step and forms no part of the apparatus comprising my invention, as with my improved process I am able to draw a continuous sheet of glass as long as there is a suitable supply of glass within the main tank 1, to feed the flow of glass into the receptacle 5. As the sheet of glass passes from the movable conveyer, any suitable means may be employed for supporting the same, and moving it forward to a cutting table where it may be severed into suitable lengths by methods well known in the art.

It is obvious that any degree of speed may be given to the several independent motors forming parts of my apparatus, and I may thereby increase or decrease the volume of air introduced into the air chamber as may be found necessary during the drawing of a sheet of glass.

I may also provide for varying the degree of draft required to "pull" a sheet of glass from the aperture in the drawing receptacle, by increasing the pressure of the glass in the drawing receptacle at that point by elevating the height of the glass line level above the aperture in the receptacle, by the tilting movement applied to the receptacle.

When the proper position of the receptacle has been determined, the amount of flow of glass from the main tank 1, into the receptacle 5, can readily be adjusted by the gate 6, controlling the flow of glass over the breastwall 4.

As the action of the machine is substantially automatic, after it is once started, it will be obvious that it can be operated with little attention.

It will be understood that many variations in the details of construction of the working parts can be made without departing from the spirit of the invention, and I do not limit myself to the proportionate sizes or the specific form of the details shown in the drawings but I do claim as new and desire to secure by Letters Patent the following:

1. A glass drawing apparatus comprising a receptacle adapted for oscillating movement having a glass discharge aperture in the side thereof, an air chamber attached to said receptacle enveloping the discharge aperture, and adapted for movement therewith, means for drawing a sheet of glass from said aperture through said air chamber, means for conveying and supporting said sheet within said air chamber, upon a column of air moving in the direction of the drawing movement, and means for varying the tension of the draw by varying the level of glass in said receptacle in relation to the discharge aperture.

2. A glass drawing apparatus comprising a movable receptacle for molten glass having an aperture in the side thereof, means for varying the level of the glass in respect to said aperture, an air chamber attached to said receptacle encircling said aperture, and adapted for movement therewith, means for drawing a sheet of glass from said aperture through said air chamber, and means for supporting the sheet while passing through the air chamber upon a moving volume of air during the congealing period.

3. A continuous sheet glass drawing apparatus, comprising a stationary tank for containing molten glass, having a discharge opening therein, a movable receptacle for receiving the molten glass from said tank, positioned below said discharge opening, having an air chamber attached thereto through which the sheet is drawn, and provided with a pair of revoluble bodies located on each side of said air chamber, having their peripheries extending into said air chamber, and adapted to apply a lateral tension to the sheet edges by a pressure contact therewith of the peripheries of the revoluble bodies moving outwardly from a medial line, and means for applying oscillating movement to the movable receptacle and air chamber, substantially as described.

4. A continuous sheet glass drawing apparatus, comprising a stationary tank for containing molten glass, having a discharge opening therein, a movable receptacle for receiving the molten glass from said tank, positioned below said discharge opening, having an air chamber attached thereto through which the sheet is drawn, and provided with a pair of revoluble bodies located on each side of said air chamber, having their peripheries extending into said air chamber, and adapted to apply a lateral tension to the sheet edges by a pressure contact therewith of the peripheries of the revoluble bodies moving outwardy from a medial line, means for varying the degree of pressure of the contact of the revoluble bodies with said sheet edges, and means for applying oscillating movement to the movable receptacle and air chamber, substantially as described.

5. A continuous sheet-glass drawing apparatus, comprising a receptacle for molten glass, means for depressing the discharge end of said receptacle, means for drawing a sheet of glass therefrom, means for applying draft from the medial line of the sheet toward its edges, and means for applying a moving column of air to the support of the sheet during its congealing period.

6. A glass drawing apparatus comprising a receptacle for containing a mass of molten glass, means for discharging glass therefrom into a movable receptacle, an air chamber attached to said movable receptacle, means for drawing a sheet of glass from said movable receptacle through said air chamber, a plurality of revolving bodies located outside of said air chamber having their peripheries extending into said air chamber, and means whereby the positions of the peripheries of said bodies in their application to the sheet edges are made to adjustably engage the sheet edges.

7. A sheet glass machine having a movable tank and means located near the outlet of the tank for projecting upon the sheet of glass issuing from the tank an air draft, extending from a medial line toward the edges of the sheet having a progressively decreasing force toward the point of least plasticity of the sheet.

8. A sheet glass machine having a tank, means for drawing a sheet of glass from said tank, an inclosed chamber located between the drawing means and the tank, means for projecting fluid under pressure into said chamber against the glass passing therethrough, and means for exhausting the air from one end of the chamber, and reintroducing a portion of the exhausted air into the opposite end of the chamber.

9. A sheet glass machine having a tank, means for drawing a sheet of glass from said tank, an air chamber located between the drawing means and the tank, means for projecting air under pressure into said chamber, means for permitting a continual escape of air from said chamber, and means for mechanically exhausting the air from one end of said chamber and reintroducing a portion thereof into the opposite end of said chamber.

10. In air regulating apparatus for sheet glass machines, an air chamber, a plurality of air conduits leading into said chamber, independent means for forcing air through said conduits, means for permitting a continual escape of air from said air chamber, and mechanical means for exhausting the air from one end of said chamber and reintroducing a portion of said exhausted air into the opposite end of the chamber.

11. In air regulating apparatus for sheet glass machines, an air chamber, an air conduit leading into said chamber, means for forcing air through said conduit, means for maintaining the air pressure therein constant, means for permitting a continual escape of air from said chamber, and mechanical means for exhausting air from said chamber and reintroducing a portion thereof into the opposite end of said chamber substantially as described.

12. A sheet glass machine having a tank adapted for oscillating movement, means for drawing a sheet of glass from said tank, an inclosed chamber located between the drawing means and the tank adapted for movement with said tank, means for projecting fluid into said chamber in an opposite direction to the glass passing therethrough, and means for diverging the movement of the fluid within the chamber toward the edges of the sheet.

13. A sheet glass machine having a tank, means for drawing a sheet of glass from said tank, an inclosed chamber located between the drawing means and the tank, means for projecting fluid into said chamber in an opposite direction to the movement of the glass, and means for supplying the fluid projecting means from the fluid within the chamber.

14. The combination with the main tank of a glass furnace for containing molten glass, of a movable tank adapted to receive glass from said main tank, mechanism to raise and lower said movable tank, an air chamber attached to said movable tank, means to draw a sheet of glass from said movable tank through said air chamber, means to force fluid against said sheet of glass while passing through said air chamber, with means for applying lateral draft to the sheet edges away from the medial line of the sheet.

15. The combination with the main tank of a glass furnace containing molten glass, of a movable receptacle for containing molten glass, adapted to receive its supply from said main tank, means for raising and lowering said movable tank, means for drawing a sheet of glass from said movable tank, a pair of revoluble bodies located adjacent to the movable tank adapted to receive glass intermediate thereof, and to apply a lateral draft thereto, and means for applying fluid pressure to both sides of the sheet of glass during the drawing operation.

16. The combination with the main tank of a glass furnace for containing molten glass, of a movable tank, mechanism to raise and lower said movable tank, means to draw a sheet of glass from said tank, an air chamber located between the drawing means and the tank, a pair of revoluble bodies located on each side of said air chamber adapted to extend into said chamber and engage the glass passing therethrough, a plurality of air conduits leading into said chamber independent means for forcing air into said conduits, means for facilitating a continual escape of air from said air chamber, and mechanical means for exhausting the air from one end of said chamber and reintroducing a portion of the exhausted air into the opposite end of the chamber.

In testimony whereof I have affixed my signature in presence of two witnesses.

RICHARD H. BOLIN.

Witnesses:
 Thomas F. Donnelly,
 J. M. Deyo.